United States Patent
Annan, Jr. et al.

(10) Patent No.: US 8,572,561 B1
(45) Date of Patent: Oct. 29, 2013

(54) MULTIPLE JAVA ME MIDLET EXECUTION IN SINGLE-INSTANCE CLDC JVM

(75) Inventors: Brandon Annan, Jr., Westwood Hills, KS (US); Jay Indurkar, Overland Park, KS (US); Nathan A. Smith, Olathe, KS (US)

(73) Assignee: Sprint Spectrum L.P., Overland Park, KS (US)

(*) Notice: Subject to any disclaimer, the term of this patent is extended or adjusted under 35 U.S.C. 154(b) by 1452 days.

(21) Appl. No.: 12/186,786

(22) Filed: Aug. 6, 2008

(51) Int. Cl.
*G06F 9/44* (2006.01)

(52) U.S. Cl.
USPC .......................................................... 717/120

(58) Field of Classification Search
USPC .......................................................... 717/120
See application file for complete search history.

(56) References Cited

U.S. PATENT DOCUMENTS

| | | | |
|---|---|---|---|
| 7,032,216 B1* | 4/2006 | Nizhegorodov | 717/152 |
| 7,079,839 B1* | 7/2006 | Papineau | 455/418 |
| 2006/0020914 A1 | 1/2006 | Arthurs et al. | |
| 2006/0136882 A1 | 6/2006 | Noonan et al. | |
| 2006/0143622 A1* | 6/2006 | Prabandham et al. | 719/328 |
| 2006/0233126 A1 | 10/2006 | Herenyi et al. | |
| 2007/0168953 A1* | 7/2007 | Diez et al. | 717/118 |
| 2008/0104572 A1* | 5/2008 | Hernandez et al. | 717/114 |

OTHER PUBLICATIONS

Oritz, Enrique; Managing the MIDlet Life-Cycyle with a Finite State Machine; Aug. 2004.*
Ghosh, Soma; The MIDlets class; Mar. 1, 2002.*
"Mobile Information Device Profile 2.0: Package javax.microedition.midlet," retrieved from http://www.forum.nokia.com/document/Java_ME_Developers_Library.html on Dec. 17, 2007.
"Sun Microsystems, CLDC HotSpot Implementation Virtual Machine," Feb. 2005.

* cited by examiner

*Primary Examiner* — Li B Zhen
*Assistant Examiner* — Bradford Wheaton

(57) ABSTRACT

Methods and systems are disclosed for Multiple Java ME MIDlet Execution in Single-Instance CLDC JVM. A subMIDlet manager may be an instance of the MIDlet class and may be capable of managing the lifecycles of component subMIDlets. SubMIDlets may contain the functionality of a MIDlet and may be configured to operate within a subMIDlet manager in a JVM and not to operate in a JVM without a subMIDlet manager. An exemplary method includes executing a single JVM that is capable of executing a single MIDlet at a time and using the JVM to execute a subMIDlet manager. Such a JVM may be present on a MIDP device. The subMIDlet manager may coordinate the activities of multiple subMIDlets executing simultaneously while appearing to the JVM as a single MIDlet.

18 Claims, 3 Drawing Sheets

MULTIPLE JAVA ME MIDLET EXECUTION IN SINGLE-INSTANCE CLDC JVM

BACKGROUND

Java Platform, Micro Edition (J2ME) outlines Java functionality for resource-constrained devices such as some cellular phones. The Connected Limited Device Configuration (CLDC) is a subset of J2ME that consists of the minimal libraries and virtual machine functions needed for a Java Virtual Machine (JVM) to function on such devices. The Mobile Information Device Profile (MIDP) is an example of a profile that operates on top of CLDC; Java applications that execute on MIDP devices are termed "MIDlets." Particular MIDlets may be games or may allow a cellular phone user to download or stream multimedia content from a network, as two examples. Newer cellular phones with increased memory and processing power may implement a more robust profile that supports a Multi-tasking Java Virtual Machine (MVM).

OVERVIEW

Disclosed herein is a mobile station capable of executing multiple subMIDlets on a single JVM. The mobile station may comprise a wireless communication interface, a processor, data storage, and data and programming instructions stored in the data storage. The program instructions may be executable by the processor to carry out functions including (i) executing exactly one JVM, wherein the JVM is capable of executing exactly one instance of a MIDlet class at any one time; and (ii) using the JVM to execute a subMIDlet manager, wherein the subMIDlet manager is an instance of the MIDlet class, and wherein the subMIDlet manager manages lifecycles of each of a plurality of subMIDlets, wherein each subMIDlet is an instance of a subMIDlet class, arranged to have its lifecycle managed by the subMIDlet manager.

Also disclosed herein is a method for executing multiple subMIDlets on a single JVM. According to the method, a mobile station or other device may execute exactly one JVM, wherein the JVM is capable of executing exactly one instance of a MIDlet class at any one time. The mobile station or device may then use the JVM to execute a subMIDlet manager, wherein the subMIDlet manager is an instance of the MIDlet class, and wherein the subMIDlet manager manages lifecycles of each of a plurality of subMIDlets, wherein each subMIDlet is an instance of a subMIDlet class, arranged to have its lifecycle managed by the subMIDlet manager.

Further disclosed herein is another method for executing multiple subMIDlets on a single JVM. According to the method, a programmer, or other entity, may convert a plurality of MIDlets into subMIDlets by replacing calls to a JVM with calls to a subMIDlet manager. The programmer may then instantiate a subMIDlet manager, wherein the subMIDlet manager is an instance of a subMIDlet manager class that inherits from a MIDlet class. By packaging the subMIDlet manager with the subMIDlets, the programmer may create a composite MIDlet. The programmer—or another entity, such as a user—may download the composite MIDlet onto a mobile station capable of executing exactly one JVM, wherein the JVM is capable of executing exactly one instance of the MIDlet class at any one time. A user, or other entity, may then launch the composite MIDlet on the mobile station. The composite MIDlet may in turn enable the user of the mobile station to select multiple subMIDlets to execute simultaneously.

These as well as other aspects, advantages, and alternatives will become apparent to those of ordinary skill in the art by reading the following detailed description, with reference where appropriate to the accompanying drawings.

DETAILED DESCRIPTION

Overview

Many mobile stations, such as those that implement MIDP, have JVMs that are only capable of running a single MIDlet at any one time. If the user of such a mobile station is running one MIDlet and desires to run another MIDlet, the user must exit the first MIDlet before launching the second MIDlet.

Because it is difficult to retrofit a new JVM into a device running an old JVM, a device typically runs the same JVM over its entire lifetime. Even were a JVM upgrade available, these devices may not possess the memory and processing capabilities to run the upgraded JVM while maintaining basic telecommunications functionality. Scaled-down memory and processing power may contribute to MIDP devices having relatively low price points and thus being attractive to consumers. A MIDP device user must now upgrade to a new, and most likely more expensive, device if that user desires the ability to run multiple MIDlets simultaneously.

MIDlets are developed by a wide range of software developers according to Java specifications, using routines from a MIDlet class, and interoperability with other MIDlets is often not considered. Additionally, many developers maintain secrecy as to MIDlet source code and are reluctant to share it with other developers. For at least these reasons, a software solution to the problem of running multiple MIDlets on a single-MIDlet JVM has not been forthcoming.

The inventive systems and methods allow for the simultaneous execution of multiple MIDlets on a single-MIDlet JVM. This is accomplished at least in part by defining a new class in Java—the subMIDlet class—that inherits from the MIDlet class, packaging MIDlet functionality into instances of the subMIDlet class, and instantiating a subMIDlet manager. The subMIDlet manager, a member of the MIDlet class, may manage the lifecycles of component subMIDlets similarly to how a JVM may manage the lifecycle of a MIDlet.

Exemplary Architecture

Figure 1:
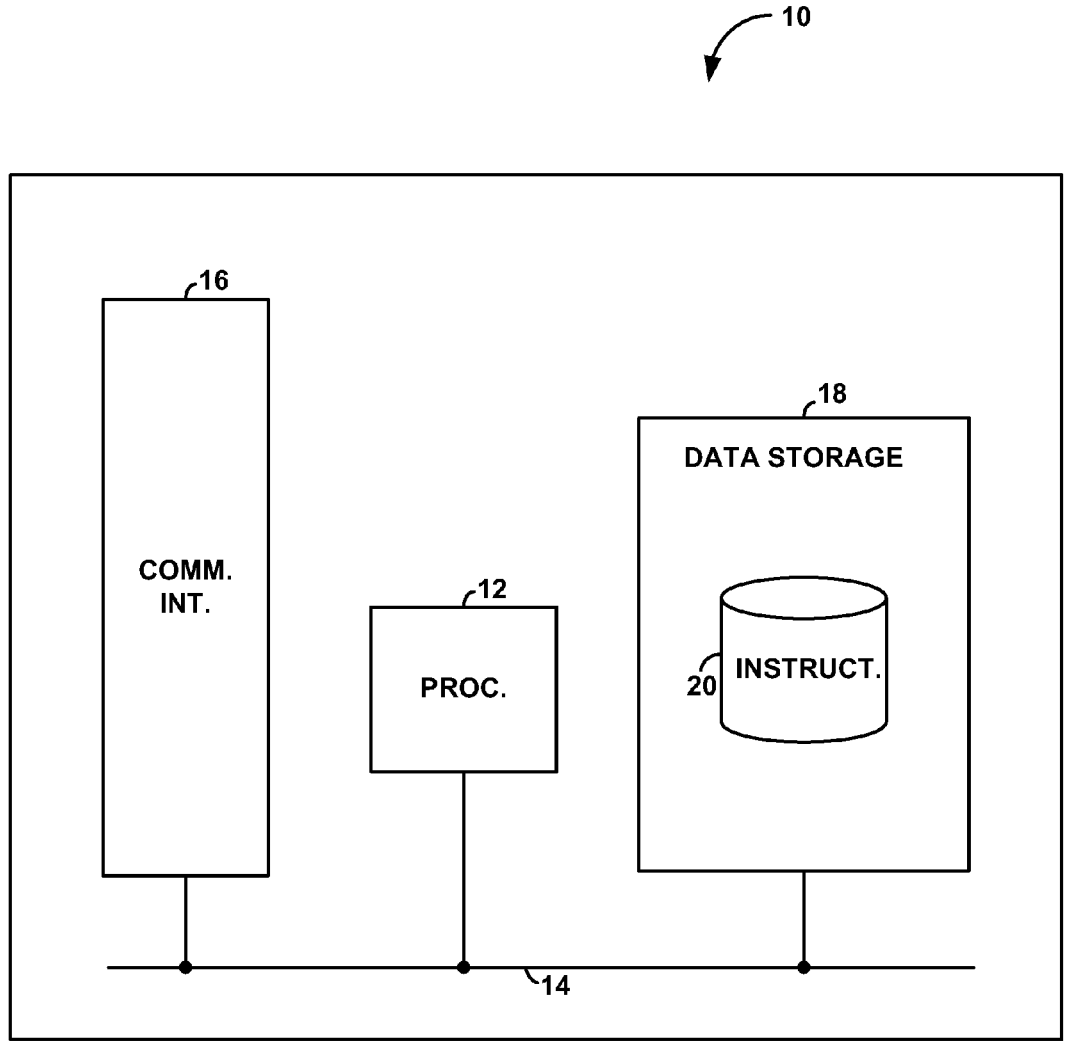
FIG. 1 is a block diagram of an exemplary mobile station.

FIG. 1 is a block diagram of an exemplary mobile station 10. This configuration should not be taken to limit the invention. A processor 12 communicates with other system components, including a communication interface 16 and data storage 18, over a system bus 14.

Communication interface 16 manages communications between mobile station 10 and other elements in a network. For instance, messages received from other components in the network may be communicated through communication interface 16 and over system bus 14 to processor 12. Similarly, messages to be transmitted to other components in the network may originate from processor 12 and travel over system bus 14 and through communication interface 16.

Data storage 18 may contain programming instructions 20, accessible by processor 12 via system bus 14. Instructions 20 may include operating system logic to execute one instance of a JVM and may further include logic to execute MIDlets. The JVM may be capable of only having a single MIDlet executing at any one time.

Exemplary Methods

Figure 2:
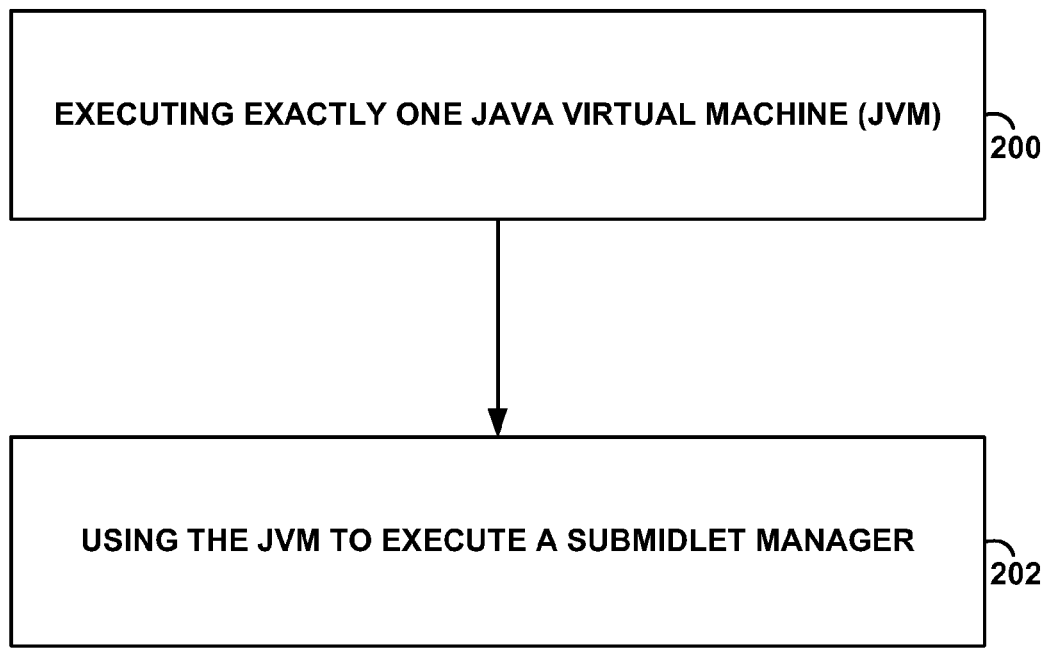
FIG. 2 is a flow diagram depicting functions carried out in accordance with an exemplary method.

FIG. 2 is a flow diagram of the behavior, in accordance with an exemplary method, of a mobile station that executes exactly one JVM, in step 200. The exactly one JVM may be capable of executing exactly one MIDlet at any one time. In step 202, the JVM executes exactly one MIDlet, a subMIDlet manager.

The subMIDlet manager may be an instance of the MIDlet class. Alternatively, the subMIDlet manager may be an instance of a subMIDlet manager class that inherits from the MIDlet class. In either case, the subMIDlet manager may contain a collection of functional sub-units called subMIDlets, which may be instances of a subMIDlet class. The subMIDlet manager may be responsible for managing the lifecycle of the subMIDlets, while the subMIDlets may be arranged to have their lifecycles managed by the subMIDlet manager. The subMIDlet manager may be agnostic to the functionality of any given subMIDlet, providing standardized lifecycle management to all subMIDlets in the collection.

This lifecycle management may include the subMIDlet manager having the ability to launch or start subMIDlets, to pause subMIDlets, and to destroy subMIDlets. To do this, the subMIDlet manager may override the MIDlet methods startApp( ), pauseApp( ), and destroyApp( ). The subMIDlet manager may notify individual subMIDlets that they are to be paused or destroyed, perhaps through the methods notifyPaused( ) and notifyDestroyed( ), respectively. In order to pause, a subMIDlet may relinquish control of all system resources.

In addition to the ability to manage the lifecycles of single subMIDlets, the subMIDlet manager may be further configured to accommodate the simultaneous execution of multiple subMIDlets. Consequently, the subMIDlet manager may allow subMIDlets to reserve and release shared system resources, such as memory or access to a mobile device speaker. The state of multiple simultaneously executing subMIDlets may be the result of a running subMIDlet requesting that the subMIDlet manager launch another subMIDlet. A transition request may occur when a subMIDlet requests that it be destroyed and that another subMIDlet be launched in its place.

The functionality of the subMIDlet manager may go beyond lifecycle management, for instance including the capability of listening for interrupts. The subMIDlet manager may itself be registered as a SystemEventListener or may allow an individual subMIDlet to register as a SystemEventListener. Upon hearing an interrupt, the subMIDlet manager may dictate behavior to the collection of subMIDlets in compliance with the interrupt. For example, the subMIDlet manager may pause all running subMIDlets in response to an interrupt. The subMIDlet manager may also have the ability to launch non-Java applications, for example by using the MIDlet.platformRequest( ) method.

A subMIDlet controller class may provide methods for communication among subMIDlets and between subMIDlets and the subMIDlet manager and may inherit from the subMIDlet manager class. For example, a subMIDlet may request system resources from either the subMIDlet manager or other subMIDlets using subMIDlet controller methods.

A subMIDlet may be similar to a normal MIDlet. For instance, a subMIDlet may encapsulate functionality such as allowing a user of a mobile phone to stream radio, to navigate the Internet, or to purchase and download music. Additionally, a subMIDlet may be responsible for garbage collection, for freeing any non-essential memory resources, and for responding to requests to release system resources. Unlike a MIDlet, however, a subMIDlet may only execute in cooperation with the subMIDlet manager and may not function outside of that context.

The full functionality of the subMIDlet, subMIDlet manager, and subMIDlet controller classes may be described in one or more application programming interfaces (APIs). This API may be advantageous for the reason of allowing multiple developers to develop subMIDlets according to specification that would work together under a subMIDlet manager without those developers having to share MIDlet source code.

Figure 3:
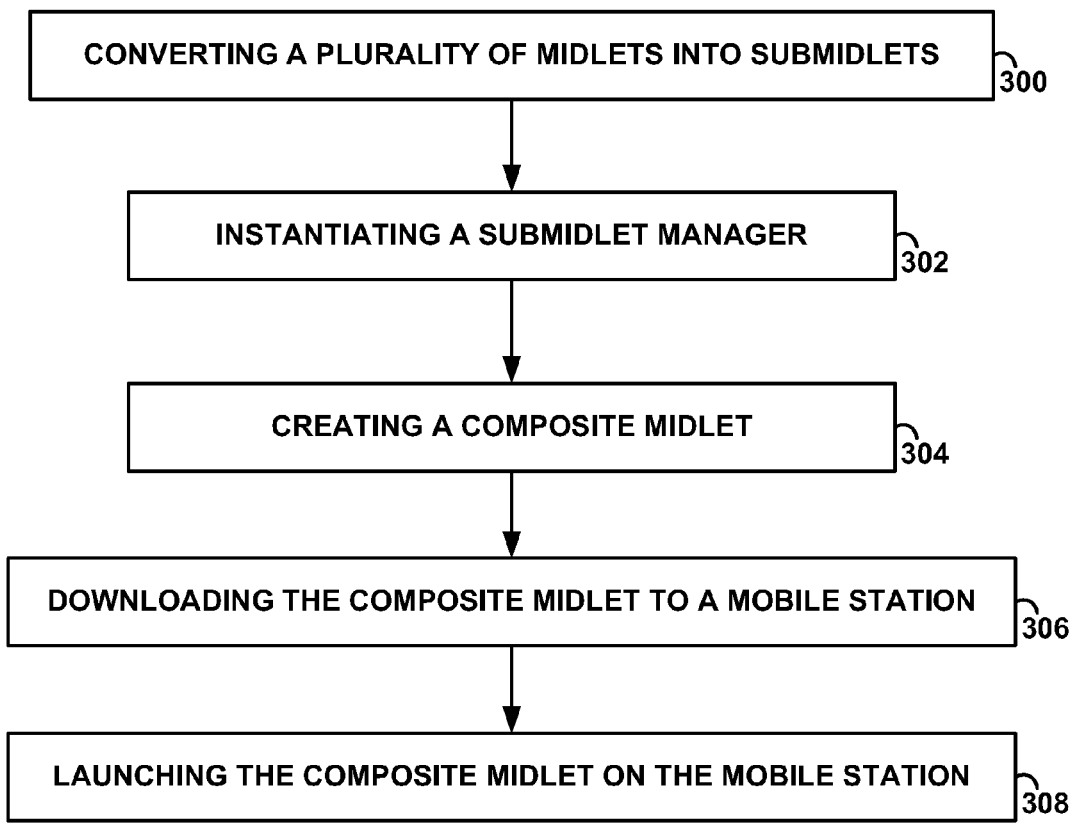
FIG. 3 is a flow diagram depicting functions carried out in accordance with another exemplary method.

FIG. 3 is a flow diagram of an exemplary method of transferring the functionality of multiple existing MIDlets onto a mobile station in accordance with the invention. In step 300, a developer may convert a plurality of MIDlets into subMIDlets. (The developer may be any human entity, machine entity, or combination of such entities capable of performing any or all steps of the method.) Preferably, each MIDlet would correspond to a single subMIDlet. To convert the MIDlets, the developer may replace existing calls to a JVM with analogous calls to a subMIDlet manager. Other modifications may be made to a MIDlet to transform it into a subMIDlet, such as the adjustment of the system resources utilized or the addition of communication or launch requests with respect to other subMIDlets. The subMIDlets may retain the basic functionality of the original MIDlets. Though the exemplary method involves the conversion of MIDlets to subMIDlets, subMIDlets may also be created from scratch using the subMIDlet, subMIDlet manager, and subMIDlet controller framework.

The developer may instantiate a subMIDlet manager in step 302. In step 304, the developer may create a composite MIDlet by packaging the subMIDlet manager together with the subMIDlets. The resultant composite MIDlet may be, from the perspective of a JVM, a single application that contains the functionality of all of the original MIDlets, though now able to be executed on a JVM that may only run exactly one MIDlet at any one time.

In step 306, the developer may download the composite MIDlet to a mobile station, such as exemplary mobile station 10, capable of executing exactly one JVM, which is in turn capable of executing exactly one MIDlet at any one time. In step 308, the composite MIDlet may be launched on the mobile station. When running, the composite MIDlet may enable a user of the mobile station to select multiple MIDlets to execute simultaneously. For example, the composite MIDlet may generate a graphical or textual menu from which the user may select multiple subMIDlets to execute. The selected subMIDlets may then execute simultaneously on the mobile station. Each executing subMIDlet may provide at least one function of a corresponding MIDlet from which it was converted. The execution of multiple subMIDlets may be coordinated by the subMIDlet manager as described above.

Exemplary embodiments of the present invention have been described above. Those skilled in the art will understand, however, that changes and modifications may be made to the embodiments described without departing from the true scope and spirit of the present invention, which is defined by the claims.

We claim:

1. A method comprising:
   executing exactly one Java Virtual Machine (JVM), wherein the JVM is configured for executing only one MIDlet at any time; and
   using the JVM to execute a subMIDlet manager, wherein the subMIDlet manager is a MIDlet, wherein the subMIDlet manager manages lifecycles of each of a plurality of subMIDlets, wherein each subMIDlet is arranged to have its lifecycle managed by the subMIDlet manager, and wherein each subMIDlet is configured for executing only in cooperation with the executing subMIDlet manager;

wherein the subMIDlet manager is an instance of a subMIDlet manager class, wherein a subMIDlet controller class inherits from the subMIDlet manager class and wherein the subMIDlet controller class provides methods for communication (a) among subMIDlets and (b) between subMIDlets and the subMIDlet manager.

2. The method of claim 1, wherein the subMIDlet manager managing lifecycles of each of a plurality of subMIDlets comprises the subMIDlet manager being configured to carry out at least one of the following: (a) to start subMIDlets, (b) to pause subMIDlets, and (c) to destroy subMIDlets.

3. The method of claim 1, wherein the subMIDlet manager allows the subMIDlets to carry out at least one of the following: (a) to reserve and (b) to release shared resources.

4. The method of claim 1, wherein the subMIDlet manager launches one subMIDlet at the request of another subMIDlet.

5. The method of claim 1, wherein the subMIDlet manager listens for an interrupt and manages the subMIDlets to operate in compliance with the interrupt.

6. The method of claim 1, wherein the subMIDlet manager is registered as a SystemEventListener.

7. The method of claim 1, wherein the subMIDlet manager allows a subMIDlet to register as a SystemEventListener.

8. A mobile station comprising:
a wireless communication interface;
a processor; and
data storage comprising data and programming instructions for:
executing exactly one Java Virtual Machine (JVM), wherein the JVM is configured for executing only one MIDlet at any time; and
using the JVM to execute a subMIDlet manager, wherein the subMIDlet manager is a MIDlet, wherein the subMIDlet manager manages lifecycles of each of a plurality of subMIDlets, wherein each subMIDlet is arranged to have its lifecycle managed by the subMIDlet manager, and wherein each subMIDlet is configured for executing only in cooperation with the executing subMIDlet manager;
wherein the subMIDlet manager is an instance of a subMIDlet manager class, wherein a subMIDlet controller class inherits from the subMIDlet manager class and wherein the subMIDlet controller class provides methods for communication (a) among subMIDlets and (b) between subMIDlets and the subMIDlet manager.

9. The mobile station of claim 8, wherein the subMIDlet manager managing lifecycles of each of a plurality of subMIDlets comprises the subMIDlet manager being configured to carry out at least one of the following: (a) to start subMIDlets, (b) to pause subMIDlets, and (c) to destroy subMIDlets.

10. The mobile station of claim 8, wherein the subMIDlet manager allows the subMIDlets to carry out at least one of the following: (a) to reserve and (b) to release shared resources.

11. The mobile station of claim 8, wherein the subMIDlet manager launches one subMIDlet at the request of another subMIDlet.

12. The mobile station of claim 8, wherein the subMIDlet manager listens for an interrupt and manages the subMIDlets to operate in compliance with the interrupt.

13. The mobile station of claim 8, wherein the subMIDlet manager is registered as a SystemEventListener.

14. The mobile station of claim 8, wherein the subMIDlet manager allows a subMIDlet to register as a SystemEventListener.

15. The mobile station of claim 8, wherein the subMIDlet manager executes at least two subMIDlets simultaneously.

16. A method comprising:
converting a plurality of MIDlets into subMIDlets at least in party by replacing calls to a Java Virtual Machine (JVM) with calls to a subMIDlet manager, wherein each subMIDlet is configured for executing only in cooperation with the executing subMIDlet manager;
instantiating the subMIDlet manager, wherein the subMIDlet manager is a MIDlet;
creating a composite MIDlet by packaging the subMIDlet manager with the subMIDlets;
downloading the composite MIDlet to a mobile station capable of executing exactly one JVM, wherein the JVM is configured for executing only one MIDlet at any one time; and
launching the composite MIDlet on the mobile station, Wherein the composite MIDlet enables a user of the mobile station to select multiple subMIDlets to execute simultaneously;
wherein the subMIDlet manager is an instance of a subMIDlet manager class, wherein a subMIDlet controller class inherits from the subMIDlet manager class and wherein the subMIDlet controller class provides methods for communication (a) among subMIDlets and (b) between subMIDlets and the subMIDlet manager.

17. The method of claim 15, further comprising using the composite MIDlet to execute multiple subMIDlets simultaneously.

18. The method of claim 17, wherein each executing subMIDlet provides at least one function of a corresponding MIDlet from which it was converted.

* * * * *